United States Patent [19]
Inana et al.

[11] Patent Number: 6,106,163
[45] Date of Patent: *Aug. 22, 2000

[54] FILM TRANSPORTING DEVICE

[75] Inventors: Katsuya Inana; Kenichi Hoshi, both of Asaki, Japan

[73] Assignee: Fuji Photo Film Co., Ltd., Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/041,741

[22] Filed: Mar. 13, 1998

Related U.S. Application Data

[62] Division of application No. 08/808,964, Feb. 19, 1997, Pat. No. 5,940,650.

[30] Foreign Application Priority Data

Feb. 23, 1996 [JP] Japan ..................................... 8-036178
Feb. 23, 1996 [JP] Japan ..................................... 8-036179
Dec. 27, 1996 [JP] Japan ..................................... 8-349938

[51] Int. Cl.$^7$ ...................................................... G03B 1/00
[52] U.S. Cl. ........................... 396/411; 396/415; 242/332
[58] Field of Search ..................................... 396/387, 395, 396/411, 415, 562; 242/332, 348.3, 349; 348/96–98

[56] References Cited

U.S. PATENT DOCUMENTS 4,274,726  6/1981  Yoneyama et al. ..................... 396/415
4,553,825  11/1985  Moulin et al. .......................... 396/562

FOREIGN PATENT DOCUMENTS

4-60531   2/1992   Japan .
4-86639   3/1992   Japan .
7-298135  11/1995  Japan .
8-171112  7/1996   Japan .

*Primary Examiner*—David M. Gray
*Attorney, Agent, or Firm*—Sughrue, Mion, Zinn, Macpeak & Seas, PLLC

[57] ABSTRACT

A windup reel is formed at a step reel which has a small diameter section and a large diameter section. The large diameter section is formed in such a direction as to press a lower edge of photographic film against a guide pin. When a leader section of transported photographic film is wound on the windup reel, the leader section tries to fit the surface of the large diameter section. For this reason, the force is applied to the photographic film so that the photographic film can move toward the large diameter section. The photographic film moves toward the guide pin, and the edge of the photographic film is pressed against the guide pin. Thereby, the photographic film is transported along the guide pin.

10 Claims, 9 Drawing Sheets

FILM TRANSPORTING DEVICE

This is a Divisional of application Ser. No. 08/808,964 filed Feb. 19, 1997, now U.S. Pat. No. 5,940,650.

BACKGROUND OF THE INVENTION

1. Field of the Invention

The present invention relates generally to a film transporting device, and more particularly to a film transporting device applied to a camera, a film scanner, a film viewer, and the like.

2. Description of the Related Art

A camera is proposed which uses photographic film coated with a magnetic recording layer, and writes the date and time of photographing, the photographing information, etc. by a magnetic head, or reads out the information from the photographic film while the photographic film is fed during photographing (Japanese Patent Provisional Publication Nos. 4-60531 and 4-86639). After the photographic film is developed, the information recorded in the magnetic recording layer is used when film images are picked up by an image sensor and are displayed on a TV monitor, or when the film images are printed on printing paper.

In order to correctly write the information in the magnetic recording layer or read out the information, the photographic film must be accurately transported toward the magnetic head. The photographic film is fed in such a manner that both edges in the longitudinal direction are guided by guide pins. However, because the guide pins are arranged at intervals wider than the width of the photographic film, only the guide pins cannot prevent the photographic film from being displaced during feeding. Thus, the magnetic recording layer dose not accurately contact the magnetic head, and the information cannot be correctly written.

To eliminate the above-mentioned disadvantages, the camera in the Japanese Patent Provisional Publication No. 4-60531 prevents the displacement between the magnetic recording layer and the magnetic head by fixing the magnetic head to a continuous guide member and pressing the guide member against one edge of the photographic film by the spring during feeding.

In the camera of the Japanese Patent Provisional Publication No. 4-866939, the magnetic head is fixed to a film pressure plate, which is moved by the force of a spring. Thereby, the guide member formed at the film pressure plate is pressed against one edge of the photographic film which is being fed, so that the displacement between the magnetic recording layer and the magnetic head can be prevented.

A film image input device has been recently proposed which picks up images on a developed continuous photographic film by an image sensor such as a charge coupled device (CCD), and displays the images on a TV monitor.

Figure 14:
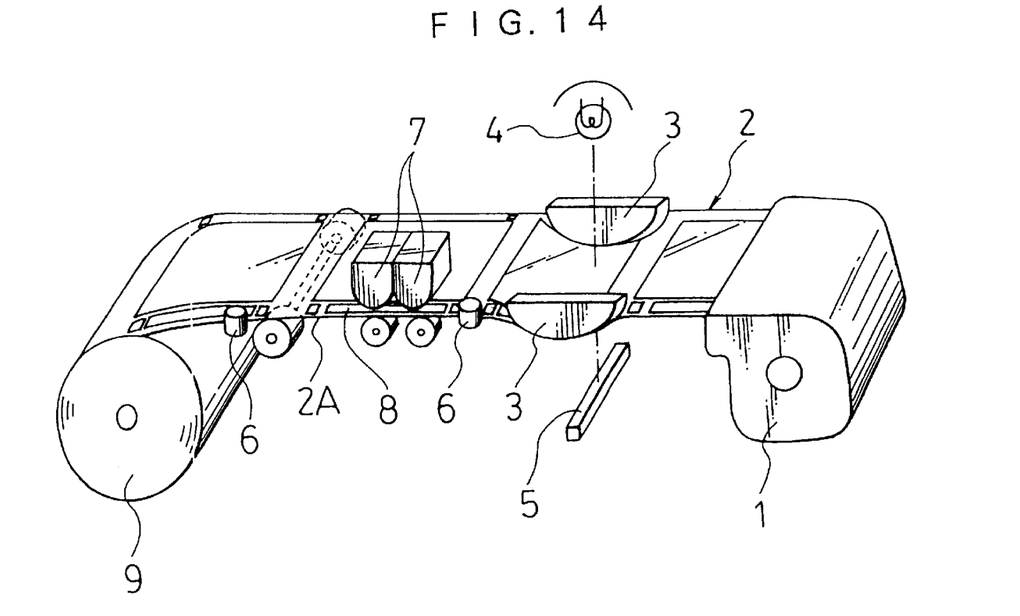

FIG. 14 describes one example of a conventional film image input device. As it appears from FIG. 14, the developed photographic film 2 is pulled out from a film cartridge 1, and the photographic film 2 which curves in the direction of its width is straightened by curved guide plates 3. Then, the light source 4 illuminates film images on the straightened photographic film, and a line sensor 5 picks up the transmitted images through a taking lens. The photographic film 2 passes through a scanning area of the line sensor 5, and it is fed in such a manner that one edge 2A is pressed against a pair of guide pins 6 by a pressing means (not shown) provided at the rear of a pair of guide pins 6. Information is written in or read from a magnetic recording layer 8 on the photographic film 2, and then the photographic film 2 is wound up by a windup reel 9 by magnetic heads 7. The applicant of this application has disclosed the above-mentioned guide plate 3 in Japanese Patent Provisional Publication No. 7-298135, and proposed the above-mentioned pressing means in Japanese Patent Application No. 6-313266.

A displacement prevention mechanism disclosed in the Japanese Patent Provisional Publication Nos. 4-60531 and 4-86639 moves the magnetic head via the guide member and the film pressure plate. Thus, the displacement prevention mechanism has a disadvantage in that the structure thereof is complicated and many parts are required. The film image input device in FIG. 14 has a disadvantage because the film, which must be kept flat by a guide plate 3 in a direction in which a line sensor reads film images, curves due to the difference of the mounting position of the film cartridge 1, and the warped images are displayed on the TV monitor.

Such disadvantages can be solved if the pressing means is not provided so as not to press the photographic film 2 against the guide pins 6. In this case, however, the photographic film 2 and the magnetic heads 7 are displaced, and the film images cannot be read steadily, or the magnetic information cannot be read or written steadily.

SUMMARY OF THE INVENTION

The present invention has been developed in view of the above-described circumstances, and has its object the provision of a simply-constructed film transporting device which is able to steadily transport photographic film and prevent the photographic film from moving on a slant or zigzagging.

In order to achieve the above-mentioned object, the present invention is directed to a film transporting device which has a film supplying means for supplying continuous photographic film, a film windup means provided with a windup reel for winding up the photographic film supplied from the film supplying means, and a guide means for guiding the photographic film transported between the film supplying means and the film windup means and provided with a guide member for regulating movement of said photographic film in a direction of width during transporting of the photographic film; is characterized in that the film windup means winds up the photographic film, an outer diameter of the windup reel in an axial direction is changed so that one edge of the photographic film is pressed against the guide member.

If the outer diameter of the windup reel in its axial direction is changed, the photographic film wound around the windup reel moves toward a position of a larger diameter. Thereby, one edge of the photographic film is pressed against the guide member, and the photographic film is steadily transported along the guide member without moving on a slant or zigzagging. If the outer diameter of the windup reel is not changed, the rotational axis of the windup reel is inclined so that the force for pressing the photographic film against the guide member can be applied to the photographic film.

According to another mode of the present invention, a film transporting device, which has a film supplying means for supplying continuous photographic film, a film windup means provided with a windup reel for winding up the photographic film supplied from the film supplying means, and a guide means for guiding the photographic film transported between the film supplying means and the film windup means and provided with a guide member for regulating the movement of the photographic film in a direction of width during transporting of the photographic film; is characterized in that when the film windup means winds up the photographic film, a rotational axis of the windup reel is inclined so that one edge of said photographic film can be pressed against the guide member.

The positions of both edges of the photographic film are regulated by the first and second guide members, and thereby the photographic film can be prevented from moving on a slant or zigzagging.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view illustrating the structure of a film scanner to which a film transporting device of the present invention applies to;

FIG. 14 is a view illustrating one example of the film scanner which a conventional film transporting device applies to.

DETAILED DESCRIPTION OF THE PREFERRED EMBODIMENTS

Figure 1:
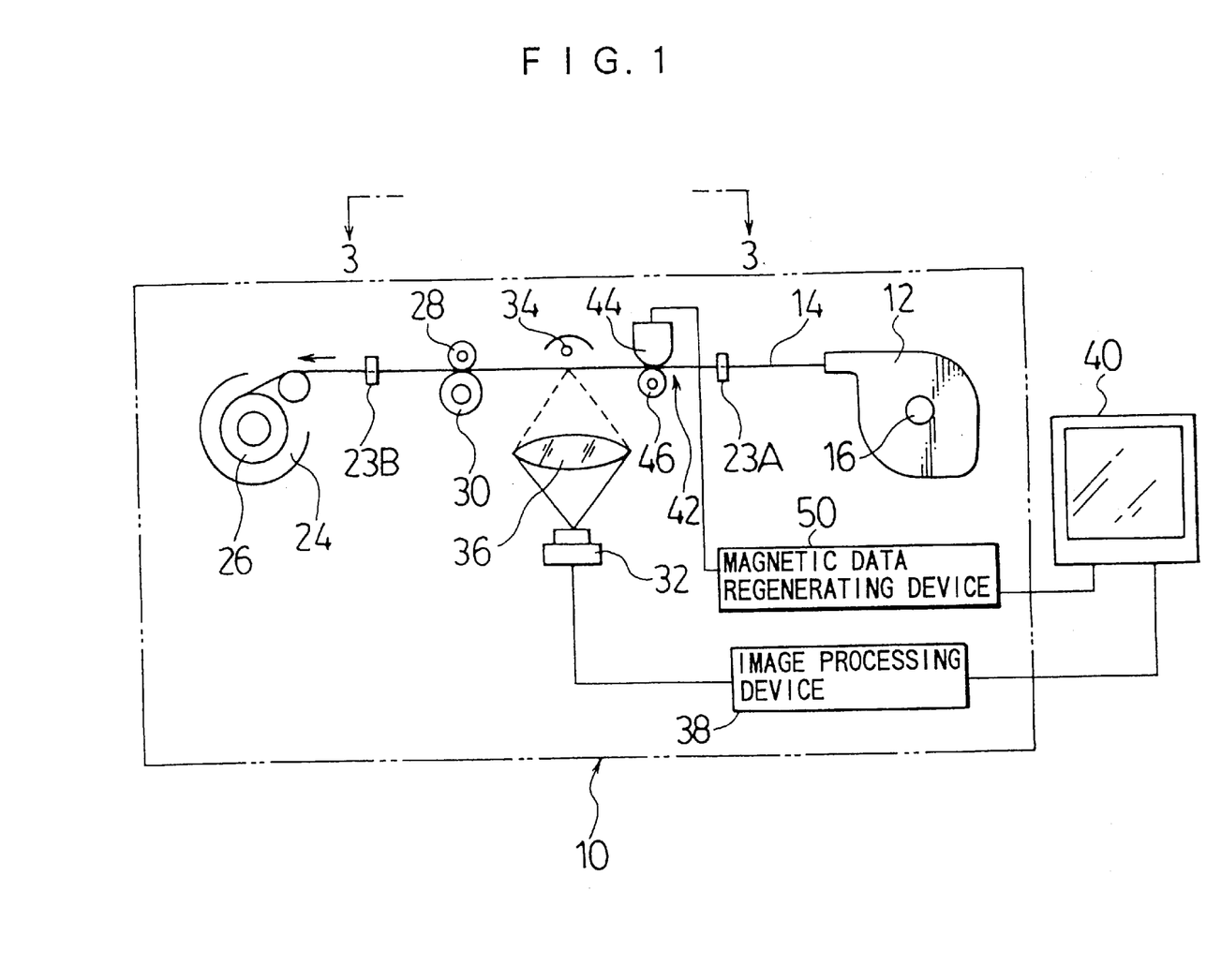

FIG. 1 illustrates the structure of a film scanner which a film transporting device of the present invention applies to.

The film scanner reads film images while a developed photographic film coated with a magnetic recording layer is being transported, and the film scanner reads the information recorded in the magnetic recording layer on the photographic film or writes the information in the magnetic recording layer.

Figure 2:
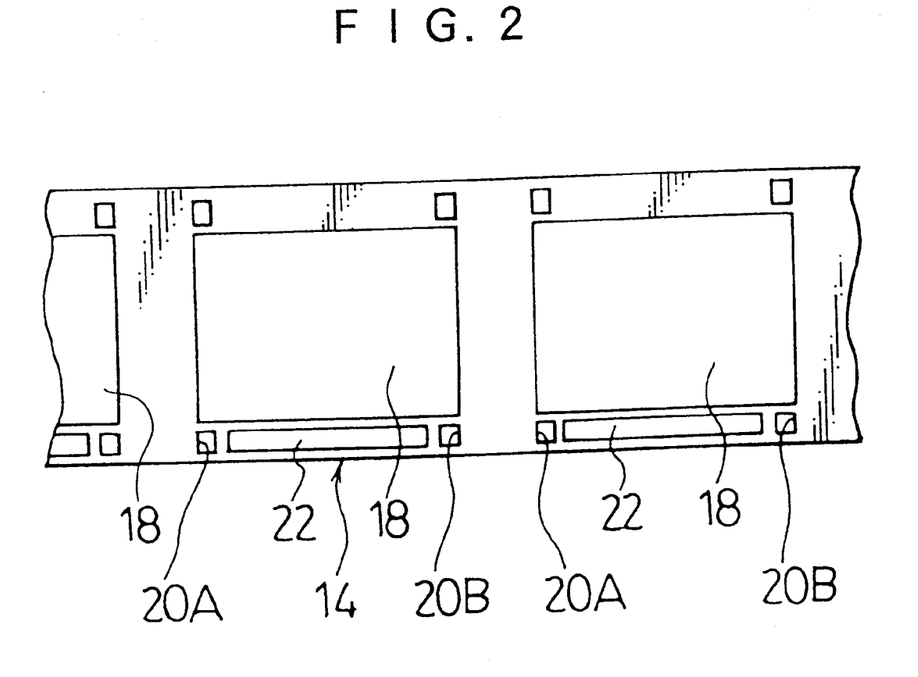
FIG. 2 is a plan view illustrating an embodiment of photographic film.

A film cartridge 12 is mounted in a film scanner body 10 which is indicated by the long and short alternate lines in FIG. 1. The photographic film 14 is wound around a spool 16 in a film cartridge 12. As depicted in FIG. 2, image areas 18, 18 . . . are formed on the photographic film 14 at predetermined intervals in the longitudinal direction. Perforations 20A and 20B are formed at a front end and a read end, respectively, of each image area. 18. A magnetic recording layer 22 is formed between the perforations 20A and 20B for each image area 18.

The photographic film 14 is pulled out from the film cartridge in FIG. 1 by a film driving mechanism, and the film 14 is guided by guide pins 23A and 23B and transported in a direction indicated by an arrow of FIG. 1. The guide pins 23A and 23B are provided at a film guide member (not shown).

The film driving mechanism consists of a film supplying section, which is coupled to the spool 16 of the film cartridge 12; a film windup section, which is coupled to a windup reel 26 of a film windup chamber 24; and a film driving section which feeds the photographic film 14 from the film supplying section at a constant speed with the film 14 being pinched between a capstan 28 and a pinch roller 30. The windup reel 26 will be described later.

The film supplying section drives the spool 16 of the film cartridge 12 in the clockwise direction in the drawing, and feeds the photographic film 14 from the film cartridge 12 until the windup reel 26 winds up the leader of the film. The film supplying section is provided with a clutch mechanism (not shown) for-controlling the rotation of the spool 16. The photographic film 14 is fed in a constant tension by the driving force of the clutch mechanism and the capstan 28.

A CCD line sensor 32, which scans frame images on the photographic film, is built in the film scanner body 10. The CCD line sensor 32 is arranged in a direction perpendicular to the feed direction of the photographic film 14. The CCD line sensor 32 reads, through a taking lens 36, the transmitted image of the photographic film 14 which is being fed and illuminated by a light source 34. Electric signals are converted by a photoelectrical transfer element, and are image-processed by an image processing device 38. Then the electric signals are output as video signals to a TV monitor 40. The images on the photographic film are displayed on the TV monitor 40.

The photographic film 14 is sent out from the film cartridge 12 and passes through a magnetic head device 42 before the scan area. The magnetic head device 42 is constructed in such a manner that a magnetic head 44 is arranged on the top side of the photographic film 14, and the magnetic head 44 is fixed to the film scanner body 10. A pad 46 is arranged on the bottom side of the photographic film 14 at a position opposite to the magnetic head 44. The pad 46 is pushed up by a spring (not shown), and presses the magnetic recording layer 22 of the photographic film 14 against the magnetic head 44. Thereby, the magnetic head device 42 is able to write the information in the magnetic recording layer 22 from the magnetic head 4, and read out the information written in the magnetic recording layer 22. A magnetic data regenerating device in FIG. 1 regenerates the readout magnetic information, so that the magnetic information as well as the film images can be displayed on the TV monitor 40.

Figure 3:
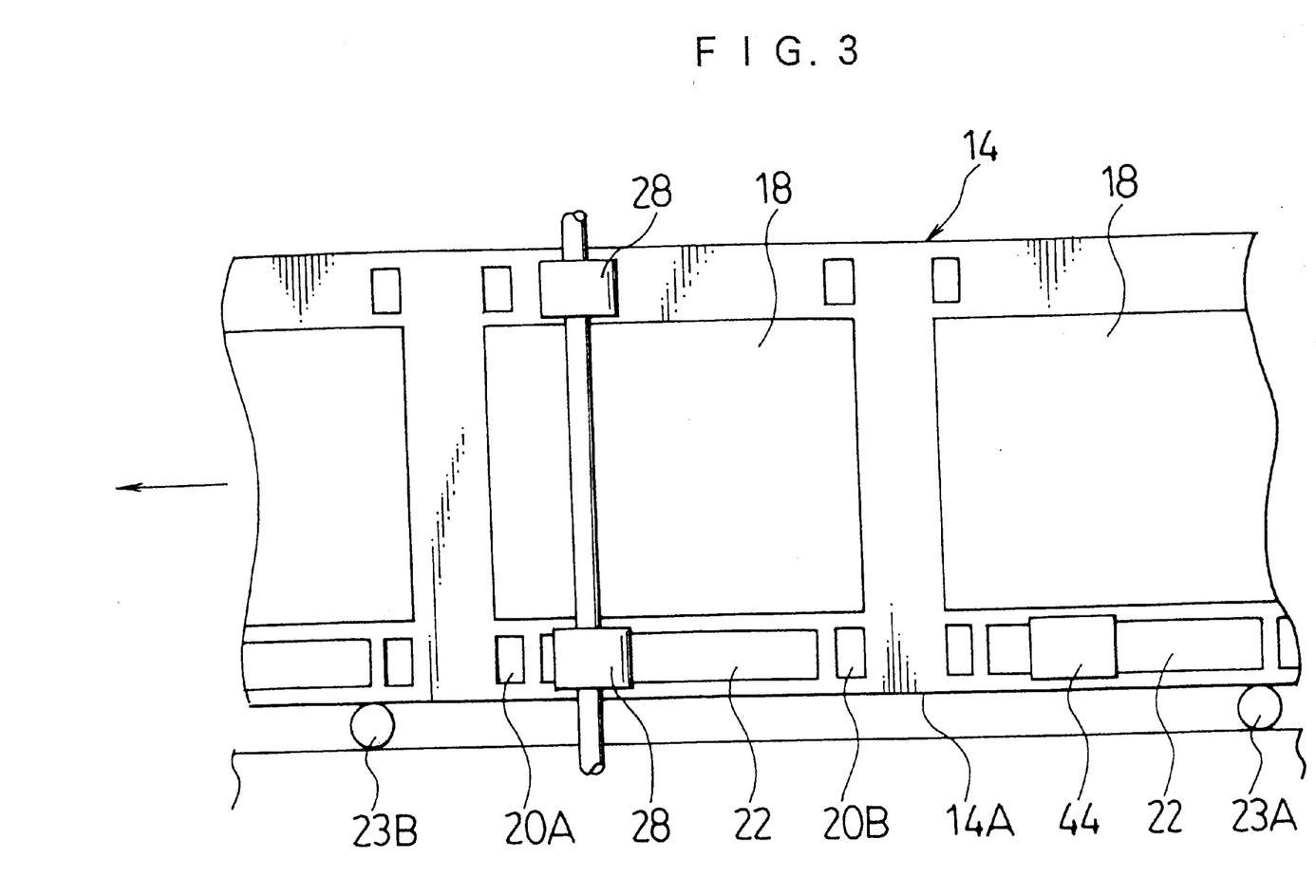
FIG. 3 is a plan view taken along line 3—3 of FIG. 1, illustrating a positional relationship between a guide pin and a pinch roller.

The magnetic head device 42, the capstan 28 and the pinch roller 30 are arranged between the guide pins 23A and 23B as depicted in FIG. 3. The guide pins 23A, 23B, and the magnetic head 44 are positioned and fixed at positions where a gap of the magnetic head 44 accurately contacts the magnetic recording layer 22 when a lower edge 14A of the photographic film 14 is pressed against the guide pins 23A and 23B.

Figure 4:
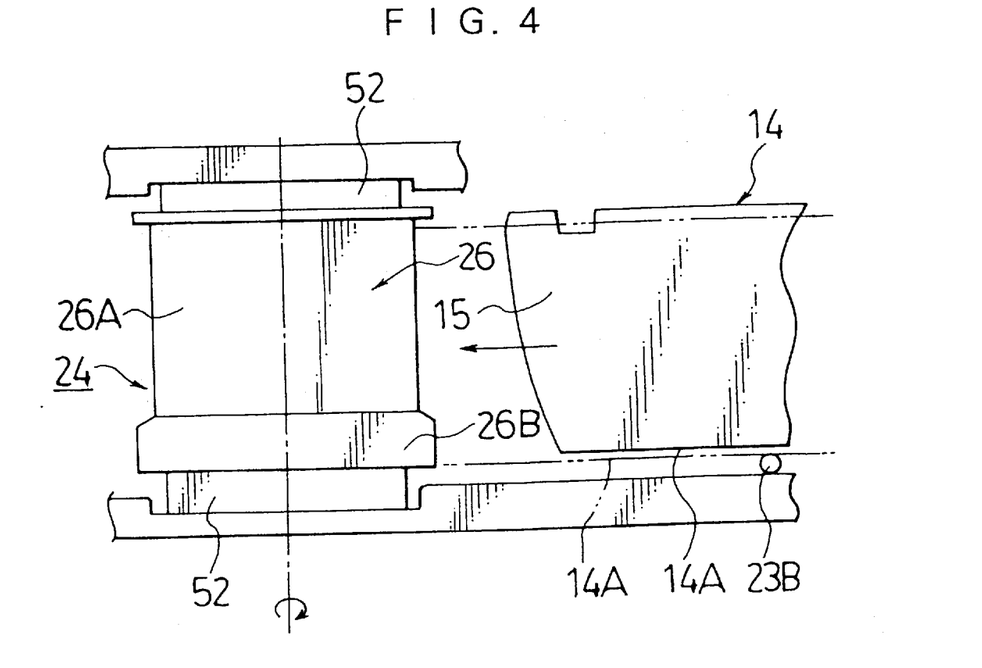
FIG. 4 is a view illustrating the first embodiment of a windup reel.
Figure 5:
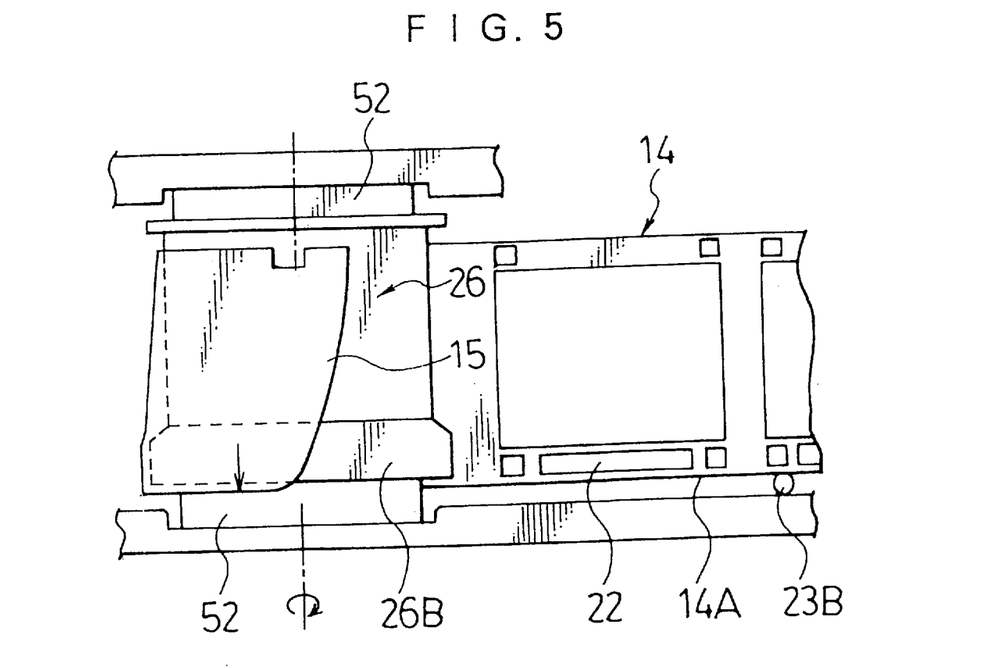
FIG. 5 is a view illustrating the windup reel in FIG. 4 winding up the photographic film.

The windup reel 26 is constructed in the following manner. Rotational shafts 52 and 52 are arranged in the film windup chamber 24. The windup reel 26 has a small diameter section 26A and a large diameter section 26B. The large diameter section 26B is formed in the direction in which the lower edge 14A of the photographic film is pressed against the guide pin 23B. When the leader section 15 of the transported photographic film 14 is wound on the windup reel 26, the leader section 15 becomes diagonal so as to fit the surface of the large diameter section 26B as indicated in FIG. 5. Then the leader section 15 starts moving down in the drawing by the rotation of the windup reel 26. Thereby, as shown in FIG. 5, the photographic film 14 is wound up by the windup reel 26 in such a state that the lower edge 14A is pressed against the guide pin 23B.

Figure 6:
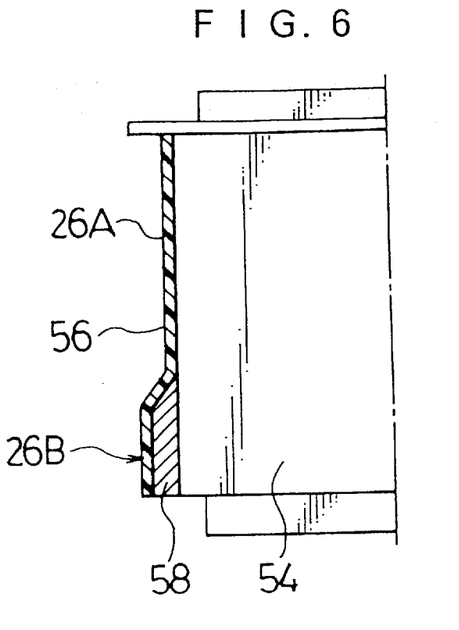
FIG. 6 is a partially sectional view illustrating the first embodiment of the windup reel in FIG. 4.
Figure 7:
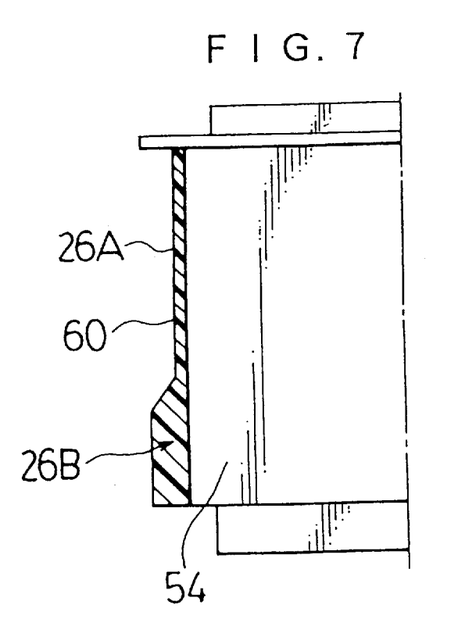
FIG. 7 is a partially sectional view illustrating the second embodiment of the windup reel in FIG. 4.

FIG. 6 is the first embodiment, illustrating the half section of the windup reel. As depicted in FIG. 6, the windup reel is constructed in such a manner that a columnar core 54 is covered with rubber 56, and a tape 58 is put between the core 54 and the rubber 56 so that the core 54 can be swelled to form the large diameter part 26B. FIG. 7 is the second embodiment, illustrating the half section of the windup reel. As depicted in FIG. 7, the windup reel is constructed in such a manner that the core 54 is covered with rubber 60, and the large diameter section 26B is formed to be thicker than the small diameter section 26A.

Next, an explanation will be given about the operation of the film transporting device which is constructed in the above-mentioned manner.

The photographic film 14 is pulled out from the film cartridge 12, and is guided by the upstream guide pin 23A to pass through the magnetic head 42 and the scan area. The photographic film 14 is transported at a constant speed by the capstan 28 and the pinch roller 30, and then the film 14 is guided by the downstream guide pin 23A to be wound up by the windup reel 26.

When the leader section 15 of the photographic film 14 is wound on the windup reel 26, the leader section 15 becomes slanted so as to fit the surface of the large diameter section 26B. Then the leader section 15 starts moving down in the drawing by the rotation of the windup reel 26. As shown in FIG. 5, when the photographic film 14 is wound up by the windup reel 26 in such a manner that the lower edge 14A of the film 14 is pressed against the guide pin 23B.

Thus, the photographic film 14 is fed in a state of being positioned toward the magnetic head 44, so that the magnetic recording layer 22 can be prevented from displacing from the magnetic head 44. In this embodiment, the information can be correctly read in and from the magnetic recording layer 22 by the magnetic head 44. The film images can be accurately read without a problem in which the screen is warped.

Figure 8:
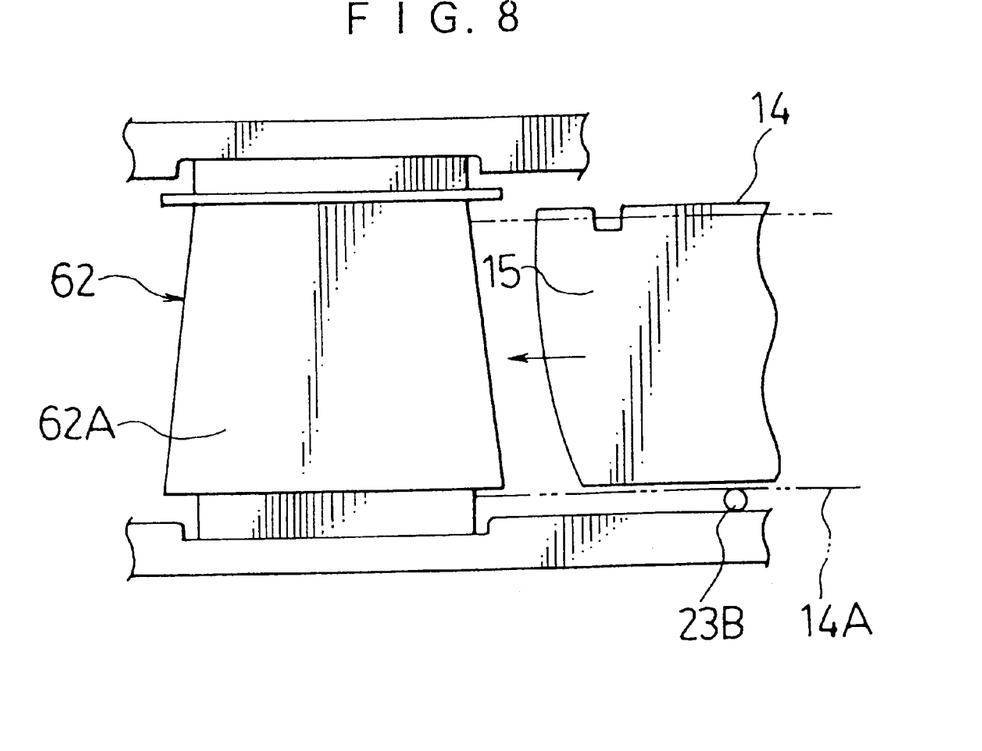
FIG. 8 is a view illustrating the second embodiment.

FIG. 8 illustrates the second embodiment of the windup reel. The windup reel in FIG. 8 is a step reel whose diameter widens in a direction (downward direction in FIG. 8) in which the photographic film is pressed. When the leader section 15 of the photographic film 14 is wound on the windup reel 62, the leader section 15 becomes slanted so as to fit the surface 62A of the windup reel 62. Then, the leader section 15 starts moving down in the drawing by the rotation of the windup reel 62. The photographic film 14 is wound up by the windup reel 26 in a state of being pressed against the guide pin 23B as indicated by long and short alternate lines in FIG. 8.

As is the case with the first embodiment, the photographic film 14 can be fed toward the magnetic head 44, and thereby the information can be correctly read in and from the magnetic recording layer 22, and the film images can be accurately read without a problem in that the images are warped.

Figure 9:
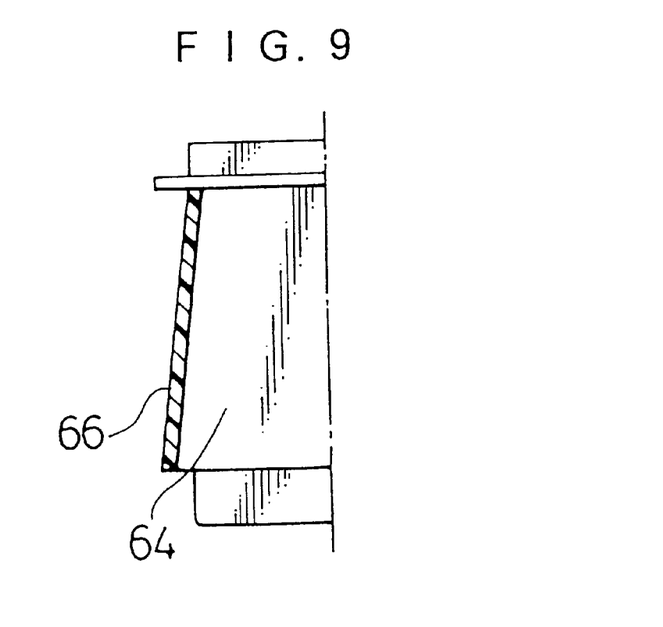
FIG. 9 is a partially sectional view illustrating the first embodiment of the windup reel in FIG. 8.
Figure 10:
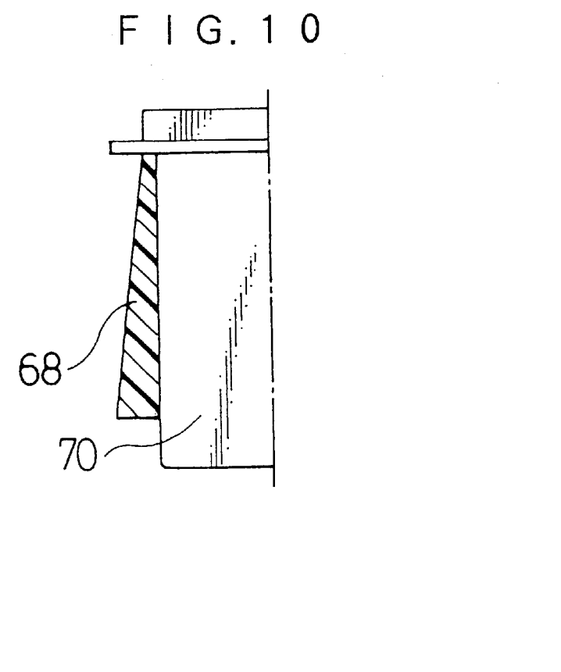
FIG. 10 is a partially sectional view illustrating the second embodiment of the windup reel in FIG. 8.

FIG. 9 is the first embodiment, illustrating the half section of the windup reel in FIG. 8. As depicted in FIG. 9, the windup reel is constructed in such a manner that a truncated cone core 64 is covered with rubber 66 which has uniform thickness. FIG. 10 is the second embodiment of the half section of the windup reel. As depicted in FIG. 10, the windup reel is constructed in such a manner that a columnar core 70 is covered with rubber 68 which becomes thicker along the direction in which the photographic film 14 is pressed.

Figure 11:
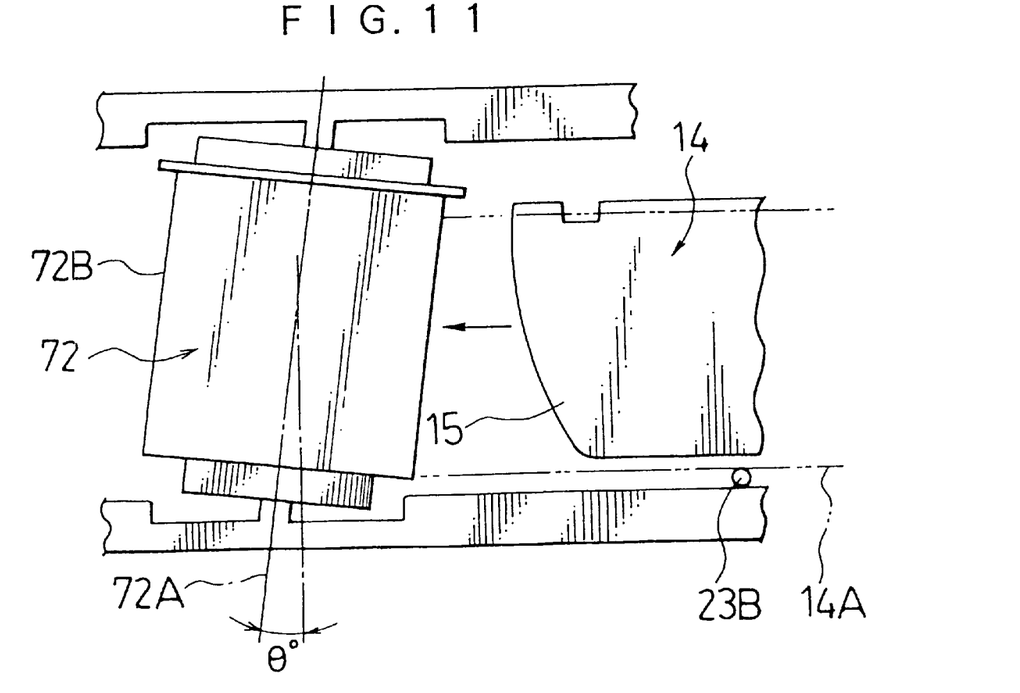
FIG. 11 is a view illustrating the second embodiment of the windup reel.

FIG. 11 describes the third embodiment of the windup reel. A rotational axis 72A of the columnar windup reel 72 is attached at a position to be inclined by θ° with regard to the direction of the width of the photographic film 14 in a direction to move away from the guide pin 23B. When the leader section 15 of the photographic film 14 is wound on the windup reel 72, the leader section 15 becomes diagonal so as to fit the inclined surface 72B of the windup reel 72. Then, the leader section 15 starts moving down in the drawing by the rotation of the windup reel 72. The photographic film 14 is wound up by the windup reel 26 in a state of being pressed against the guide pin 23B as indicated by long and short alternate lines in FIG. 11.

As is the case with the first and second embodiment, in the third embodiment, the photographic film 14 can be fed toward the magnetic head 44, and thereby the information can be correctly read in and from the magnetic recording layer 22, and the film images can be accurately read.

As stated above, according to the first, second and third embodiments, only if the shape of the windup reels 26 and 62 is changed, or if the rotational axis 72A of the windup reel 72 is inclined, the displacement of the photographic film 14 can be prevented during transportation.

Figure 12:
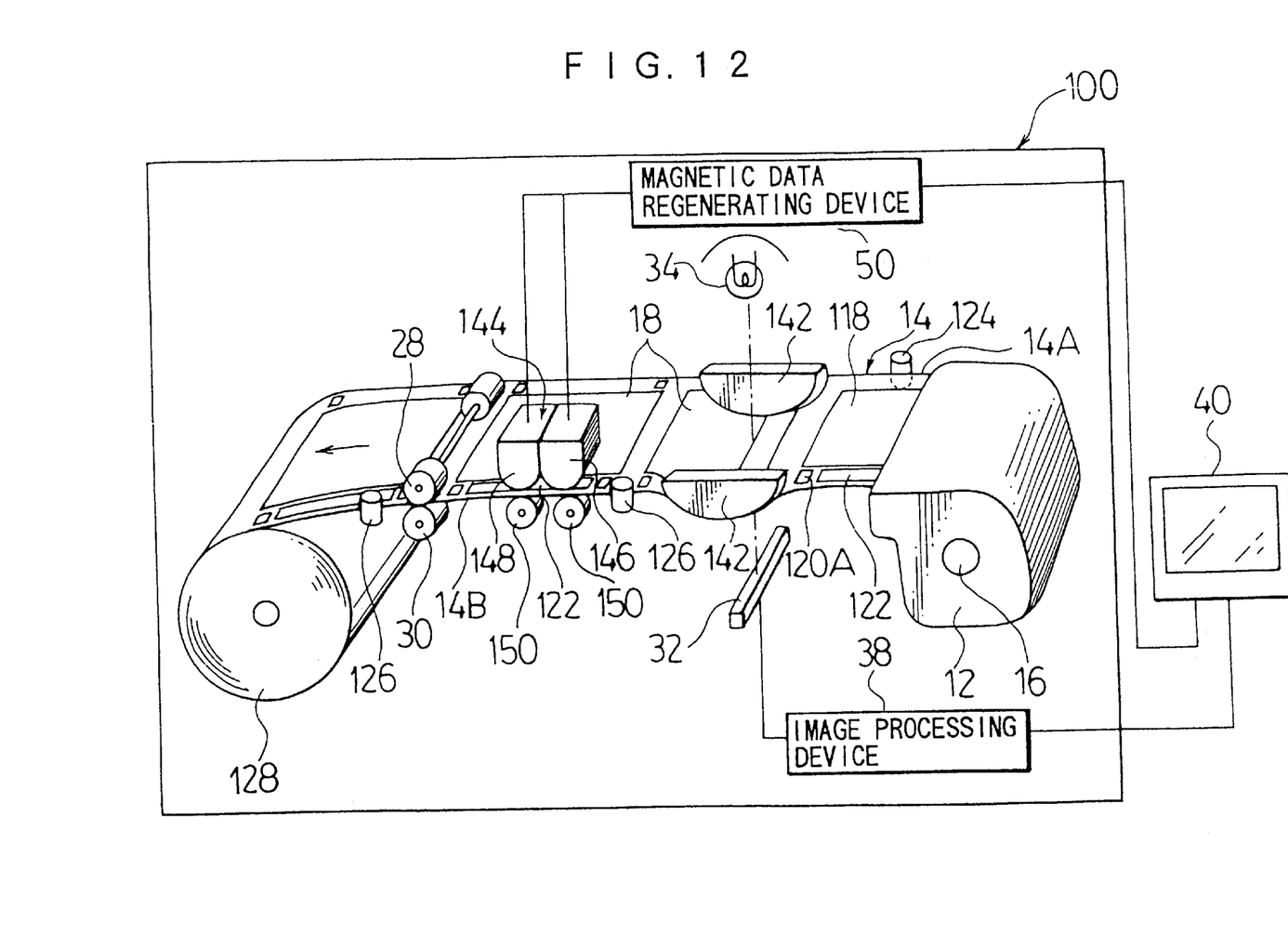
FIG. 12 is a view illustrating the structure of a film scanner for another embodiment of the film transporting device according to the present invention.

FIG. 12 illustrates the structure of the film scanner which another embodiment for the film transporting device according to the present invention.

The film scanner reads the film images during feeding of the developed photographic film coated with the magnetic recording layer. The film scanner also reads the information recorded in the magnetic recording layer on the photographic film, or writes the information in the magnetic recording layer. Parts similar to those of the film scanner previously described with reference to FIG. 1 are denoted by the same reference numerals, and they are not described in detail here.

As depicted in FIG. 12, the film cartridge 12 in which the photographic film 14 is wound on the spool 16 is mounted in the film scanner body 100. The photographic film 14 is sent out from the film cartridge 12 by the film driving mechanism. Then the photographic film 14 is regulated in position by the guide pin 124 and a pair of the guide pins 126 and 126, and is fed in the direction of an arrow in FIG. 12. A detailed explanation will be given later about the guide pin 124 and the pair of the guide pins 126 and 126.

The photographic film 14 passes through the scan area which is provided with the CCD line sensor 32 and the light source 34, and then passes through a magnetic head device 144. In the magnetic head device 144, magnetic heads 146 and 148 for recording and regeneration are arranged adjacent to each other, and the magnetic heads 146 and 148 are fixed to the film scanner body 100. Pads 150 and 150 are arranged on the bottom side of the photographic film 14 to face the magnetic heads 146 and 148. The pads 150 and 150 are pushed up by a spring (not shown), and presses the magnetic recording layer 22 of the photographic film 14 against the magnetic heads 146 and 146. Thereby, the magnetic head device 144 is able to write the information, in the magnetic recording layer 22 from the magnetic head 146, and reads out the information written in the magnetic recording layer 22 by the magnetic head 148.

If viewed from the guide plate 142, the guide pin 124 is arranged closer to the film cartridge 12 than to the windup reel 128. The guide pin 124 is fixed at such a position as to abut on the edge 14A of the photographic film 14 which is being fed.

On the other hand, a pair of guide pins 126 are arranged closer to the windup reel 128 than to the film cartridge 12 if viewed from the guide plate 142. The pair of the guide pins 126 are fixed to both sides of the magnetic head device 144. The photographic film 14 passes through the magnetic head device 144 in such a state that the edge 14B is pressed against the pair of the guide pins 126 by the force of a pressing means (not shown).

The guide pins 124 and 126 are arranged at intervals of a substantially median value of a difference of the width of the photographic film.

The pressing means favorably pushes the photographic film toward the guide pin 126 during feeding by changing the outer diameter of the windup reel 128 or inclining the rotational axis of the windup reel. The present invention, however, is not restricted to this. For example, it is possible to use a mechanism which is disclosed in Japanese Patent Application No. 6-313266 by the applicant of the present application.

Next, an explanation will be given about the operation of the guide pins 124 and 126.

Figure 13:
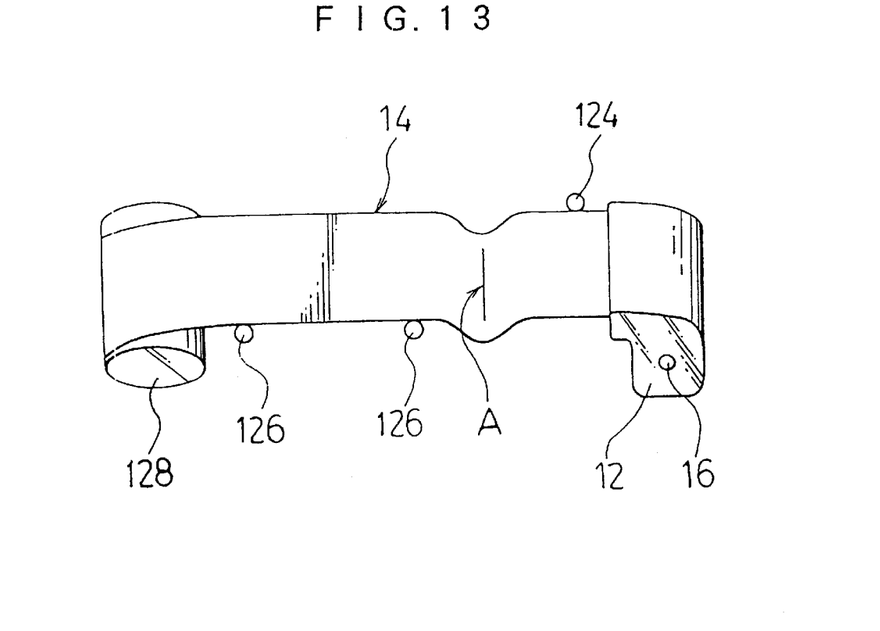
FIG. 13 is a conceptional view illustrating the photographic film being transported by means of a guide pin.

The edge 14A of the photographic film 14 is fed in such a manner that the guide pin 24 regulates the position of the edge 14A, and the edge 14B is pressed against the guide pins 126. That is, as depicted in FIG. 13, the photographic film 14 is fed in a state of being positioned on a feed path between the guide pin 124 and the guide pins 126. In this case, if the mounting positions of the film cartridge are uneven, the guide pins 124 and 126 can correct the slant or zigzag movement of the photographic film 14 resulting from the unevenness.

Thus, the photographic film 14 can be kept flat at a position (position A in FIG. 13) of the guide plate 142 arranged between the guide pins 124 and 126, regardless of the unevenness of the positions where the film cartridge 12 is mounted. Thereby, the line sensor 32 picks up the frame images which are not warped, so that the satisfactory images can be displayed on the TV monitor 40. Because the edge 14B of the photographic film 14 is pressed against the guide pins 126, the magnetic information can be steadily read or written by means of the magnetic heads 146. and 148.

If the guide pin 124 is arranged between the guide pins 126, the position of the photographic film 14 cannot be regulated at the upstream of the guide plate 142. For this reason, the photographic film cannot be kept flat, and the intervals at which the guide pins are arranged cannot be set at less than a maximum value of the difference of the width of the photographic film 14. Thus, the position of the photographic film 14 cannot be regulated without fail.

In this embodiment, the guide pin is used as the guide member for regulating the positions of both edges of the photographic film; however, the present invention is not restricted to this. Moreover, the film transporting device of the present invention can be applied not only to the film scanner but to a camera and a film viewer in which film images are viewed with a person's eyes. In this case, an exposed area of the camera, or an observed area of the film viewer is favorably arranged between two guide members which regulate the positions of both edges of the photographic film.

As set forth hereinabove, according to the film transporting device of the present invention, only if the outer diameter of the windup reel is changed, or if the rotational axis is inclined, the force can be applied to the photographic film so that the photographic film can fit the guide member, and thereby the photographic film can be prevented from moving on a slant or zigzagging.

In the case of the photographic film provided with the magnetic recording layer, the information can be correctly read from or written in the magnetic recording layer. When the frame images on the photographic film can also be correctly read. Further, when the camera exposes the photographic film to light, the exposed area of each frame can be accurately exposed to light.

According to the present invention, while the photographic film is transported from the film supplying section to the film windup section, the photographic film can be prevented from moving a slant or zigzagging. The photographic film can be wound up to a predetermined position of the windup reel, and thereby when the photographic film is fed from the windup reel, the photographic film can be prevented from moving on a slant or zigzagging. In this case, the magnetic information can be read or written, or the frame images can be read satisfactorily.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A film transporting device which has film supplying means for supplying continuous photographic film, film windup means provided with a windup reel for winding up the photographic film supplied from said film supplying means, said windup reel having small and large diameter portions, and guide means for guiding the photographic film transported between said film supplying means and said film windup means and provided with a guide member for regulating movement of the photographic film in a direction of width during transporting of the photographic film, wherein said windup reel is without a flange at the large diameter portion thereof so that, when said film windup means winds up said photographic film, one edge of said photographic film on the large diameter portion side of said windup reel is pressed against said guide member which is disposed between said film supplying means and said film windup means.

2. The film transporting device as defined in claim 1, wherein said windup reel is a step reel which is formed in such a manner that an outer diameter of said windup reel at one part is larger than outer diameter at other parts.

3. A film transporting device as defined in claim 1, wherein said windup reel has a truncated cone, shape an outer diameter of said windup reel changing sequentially in an axial direction.

4. The film transporting device as defined in claim 1, wherein said photographic film is housed in a film cartridge having a rotatable spool around which said photographic film is wound, and said film supplying means has a cartridge housing section housing said film cartridge and spool driving means coupled to said spool of said film cartridge housed in said cartridge housing section and driving said spool.

5. The film transporting device as defined in claim 1, wherein a magnetic recording layer is formed on said photographic film, and a magnetic head for recording magnetic information in said magnetic recording layer or regenerating said magnetic information from said magnetic recording layer is disposed at a predetermined position relative to said guide member.

6. A film transporting device which has film supplying means for supplying continuous photographic film, film windup means provided with a windup reel for winding up the photographic film supplied from said film supplying means, and guide means for guiding the photographic film transported between said film supplying means and said film windup means and provided with a guide member for regulating movement of the photographic film in a direction of width during transporting of the photographic film, wherein a rotational axis of said windup reel is inclined so that, when said film windup means winds up the photographic film, one edge of the photographic film is pressed against said guide member which is disposed between said film supplying means and said film windup means.

7. The film transporting device as defined in claim 6, wherein a magnetic recording layer is formed on said photographic film, and a magnetic head for recording magnetic information in said magnetic recording layer or regenerating said magnetic information from said magnetic recording layer is disposed at a predetermined position relative to said guide member.

8. The film transporting device as defined in claim 6, wherein said photographic film is housed in a film cartridge having a rotatable spool around which said photographic film is wound, and said film supplying means has a cartridge housing section housing said film cartridge and spool driving means coupled to said spool of said film cartridge housed in said cartridge housing section and driving said spool.

9. A film scanner which has film supplying means for supplying continuous photographic film, film windup means provided with a windup reel for winding up the photographic film supplied from said film supplying means, said windup reel having small and large diameter portions, and guide means for guiding the photographic film transported between said film supplying means and said film windup means and provided with a guide member for regulating movement of the photographic film in a direction of width during transporting of the photographic film, wherein said windup reel is without a flange at the large diameter portion thereof so that, when said film windup means winds up said photographic film, one edge of said photographic film on the large diameter portion side of said windup reel is pressed against said guide member which is disposed between said film supplying means and said film windup means.

10. A film scanner device which has film supplying means for supplying continuous photographic film, film windup means provided with a windup reel for winding up the photographic film supplied from said film supplying means, and guide means for guiding the photographic film transported between said film supplying means and said film windup means and provided with a guide member for regulating movement of the photographic film in a direction of width during transporting of the photographic film, wherein a rotational axis of said windup reel is inclined so that, when said film windup means winds up the photographic film, one edge of the photographic film is pressed against said guide member which is disposed between said film supplying means and said film windup means.

\* \* \* \* \*